INVENTOR

Andrew W. Knapp

BY Spencer, Rockwell & Bartholow
ATTORNEYS

INVENTOR
Andrew W. Knapp
BY Spencer, Rockwell & Bartholow
ATTORNEYS

INVENTOR

Andrew W. Knapp

BY Spencer, Rockwell & Bartholow
ATTORNEYS

United States Patent Office 3,171,593

Patented Mar. 2, 1965

3,171,593

INFORMATION STORAGE DEVICE AND PERFORATING APPARATUS

Andrew W. Knapp, 24 Rockdale Road, West Haven, Conn.

Filed Dec. 5, 1962, Ser. No. 242,443
19 Claims. (Cl. 234—90)

This invention relates to apparatus for perforating tape in accordance with predetermined information in programmed or coded form.

Perforated tape is finding increasing usage as a medium for storing information to be fed to a sensing device for utilization in a control system. Such usages may include machine tool control systems, traffic control systems, etc. Information is stored in the tape in the form of predetermined patterns of perforations.

The present invention provides an apparatus for perforating tape in accordance with information noted on a work or program sheet or other coding schedule. The invention contemplates the provision of an electrical circuit utilizing bistable memory elements which are set in one of two states in accordance with information on a coding schedule wherein the coding schedule is positioned in a predetermined manner over a plurality of parallel conductor strips, each connected to a memory unit, and a probe member is utilized to make an electrical connection with the conductor strips in accordance with the information on the coding schedule and thereby transmit the information on the schedule to the memory units. The memory elements are arranged to release the information to command a perforating mechanism to perforate a tape in accordance with the information stored in the memory units. The invention includes means for erasing any information stored in the memory units to correct any errors that may have been made in setting the memory units in one of two stable states and means for repeating perforations corresponding to information stored in the memory units prior to clearing the memory units. The invention further includes means for rapidly advancing the tape predetermined numbers of spaces between rows of perforation to be made thereon.

The invention provides such an apparatus which is easily operated by an unskilled person, which is of simplified structure and which is economical in manufacture.

Accordingly, it is an object of this invention to provide a new and improved tape perforating apparatus.

Another object of this invention is to provide a new and improved tape perforating apparatus which is easily operated with a minimum of skill or training.

Another object of this invention is to provide a new and improved tape perforating apparatus in which the information introduced into the apparatus is visually indicated and erasure thereof from the memory units may be accomplished prior to commanding the apparatus to perforate.

A further object of the invention is to provide a tape perforating control wherein memory units which store information contained in a coding schedule are energized in accordance with such information when a probe unit engages selected portions of the coding schedule.

A further object of the invention is to provide a new and improved information storage device wherein information contained on a medium such as a coding schedule may be rapidly transferred to an information storage device.

The features of the invention which are believed to be novel are pointed out with particularity in the claims appended to and forming part of this specification. However, the invention, both as to its organization and operation, together with further objects and advantages thereof, may best be appreciated by reference to the following detailed description taken in conjunction with the drawings wherein:

FIGS. 3, 4 and 5 are illustrative of a tape perforating mechanism utilized with the invention wherein:

FIG. 3 is a side elevation, partly in section, of a tape perforating mechanism;

FIG. 4 is a sectional view seen along line 4—4 of FIG. 3;

FIG. 5 is a sectional view seen along line 5—5 of FIG. 4, and

Figure 1:
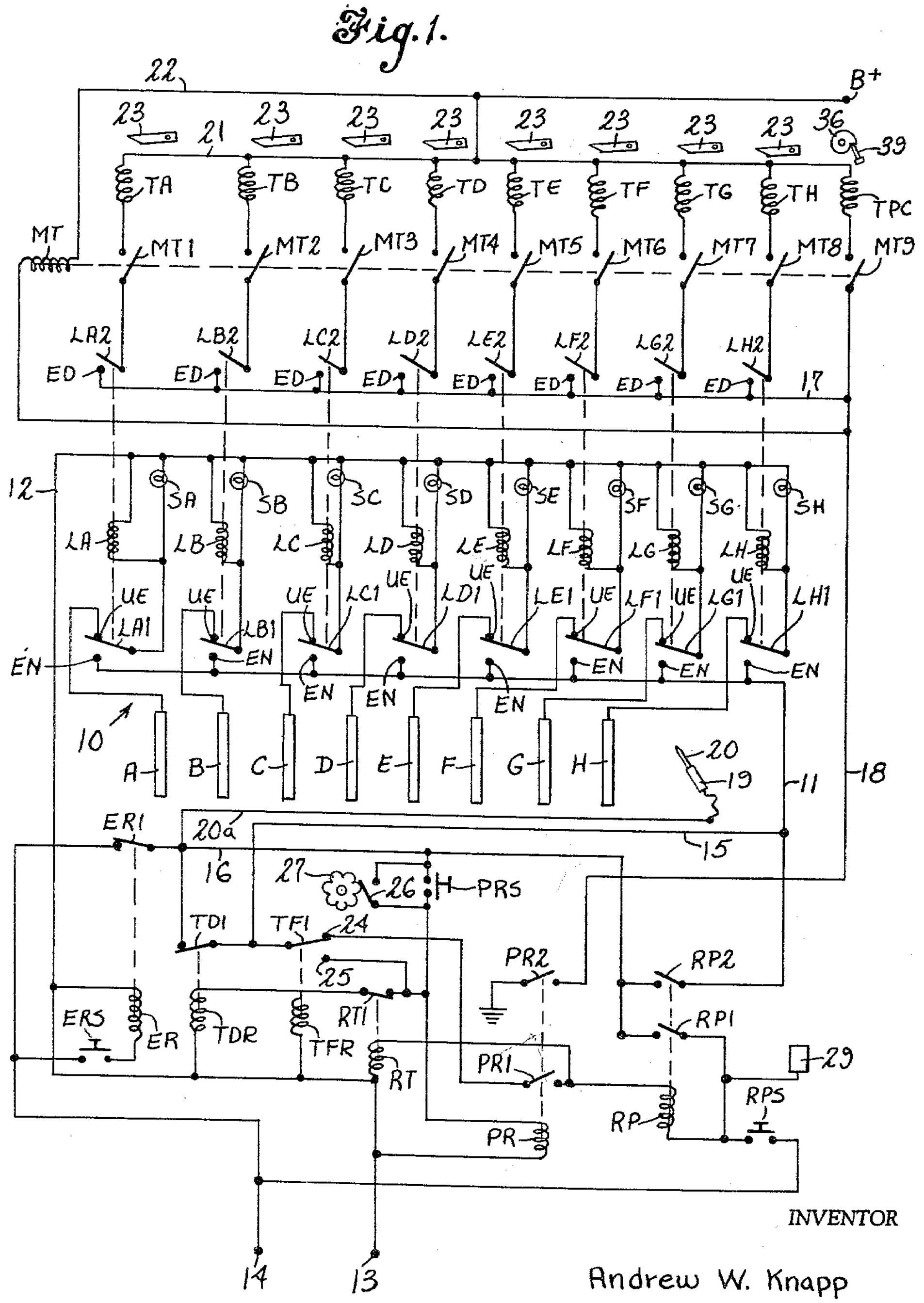
FIG. 1 is a schematic diagram of a tape perforation control network embodying the invention.

The network of FIG. 1 is arranged to receive and store information in coded form in bi-stable electrical devices which are set in one of two states in accordance with the information received. Upon command the network will transfer the information stored therein to a tape perforating mechanism which will produce a row of perforations in a tape in accordance with the set states of the bi-stable devices and advance the tape for a new row of perforations. The information introduced into the bi-stable electrical devices may be binary encoded decimal numbers or may represent information noted on a particular coding schedule as hereinafter exemplified.

The network of FIG. 1 comprises a register 10 comprised of a series of memory units, bistable electrical devices, illustrated as relays, LA, LB, LC, LD, LE, LF, LG and LH, each controlling a pair of switch arms LA1–LH1 and LA2–LH2, respectively. Each of relays LA–LH may be set in an energized or unenergized state. Each of switch arms LA1–LH1, when its controlling coil is in an unenergized state contacts an associated terminal UE. Each of terminals UE is connected to one of a series of parallel conductor strips or grids A–H. Each of switch arms LA1–LH1, when its controlling coil is in an energized state is moved to contact a second associated terminal EN, all of which are connected to a line 11.

Relay coils LA–LH are each connected, when in an unenergized state, between an associated terminal UE and a line 12 connected to an input terminal 13. Line 11 is connected to an input terminal 14 through a line 15 and a normally closed relay-controlled switch arm TD1 to a line 16 connected to input terminal 14. Input terminals 13 and 14 are connectable to a suitable source of electric energy, not shown.

All of switch arms LA2–LH2 are normally-open but are closed on an associated terminal ED when their controlling coils LA–LH, respectively, are energized. Closing of each of switch arms LA2–LH2 enables energization of an associated solenoid TA–TH upon closing of an associated switch arm MT1–MT8, as hereinafter explained. Each of terminals ED is connected to a line 17 which is connectable to ground through line 18 and a normally-open relay-controlled switch arm PR2. Connected across each of relay coils LA–LH is a signal light SA–SH, respectively, which visually indicates when its associated relay coil is energized.

In accordance with one aspect of the invention a probe member 20 is electrically connected by means of line 20a to terminal 14 through normally closed relay-controlled switch arm ER1. When probe member 20 makes electrical contact with any of conductor strips A–H, a circuit is completed through an associated one of relay coils LA–LH. Conductor strips A–H are arranged in parallel relationship as hereinafter described. In this manner selected ones of relays LA–LH are energized, closing controlled switch arms LA1–LH1 on associated terminals EN. When switch arms LA1–LH1 close on an associated terminal EN, their controlling relays LA–LH are connected between lines 11 and 12 which latches the relays in an energized state. When selected ones of relays LA through LH are energized, corresponding switch arms LA2–LH2 are also closed on associated terminals ED connected to line 17 to enable energization of an associated one of solenoids TA–TH. Probe member 20 is provided with a piercing point adapted to pierce a program sheet or schedule positioned over strips A–H, as hereinafter described in conjunction with FIG. 2.

A source of potential indicated by the symbol B+ is connectable to line 21 and also to line 22 which includes the coil of master tape perforate relay MT. Line 22 is connected to line 18, as is line 17. Master tape perforate relay MT controls a plurality of contacts MT1 through MT9. Each of contacts MT1–MT9 are arranged to connect a tape perforate solenoid TA–TH to an associated switch arm LA2–LH2 and a tape perforate clutch solenoid TPC to line 21 upon energization of relay MT. Each of solenoids TA–TH control an associated latching member 23 and solenoid TPC controls a clutch mechanism in a tape perforating mechanism as hereinafter described.

Figure 3:
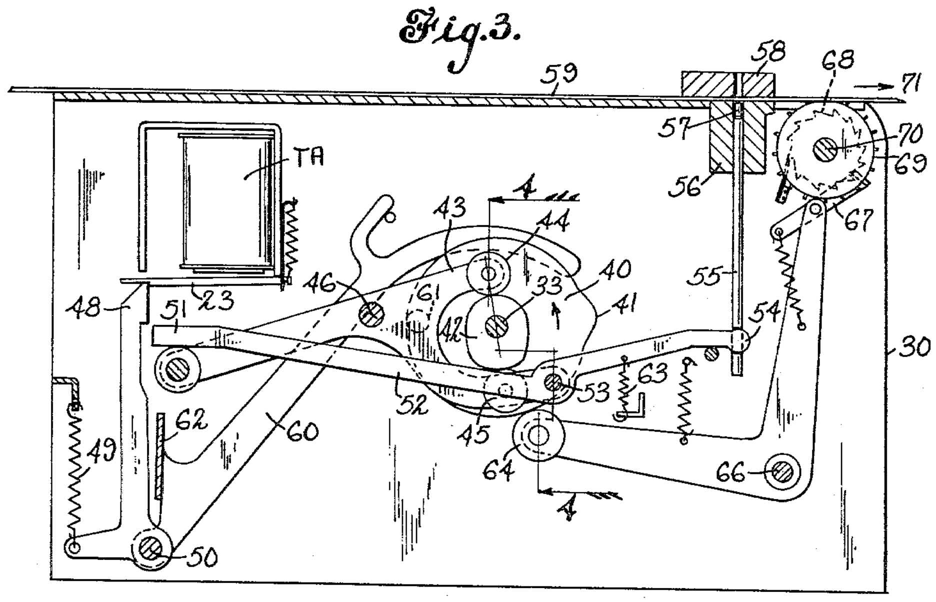
Figure 4:
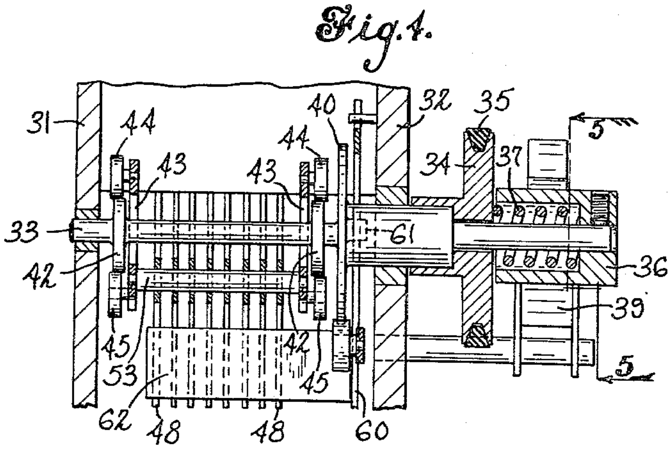
Figure 5:
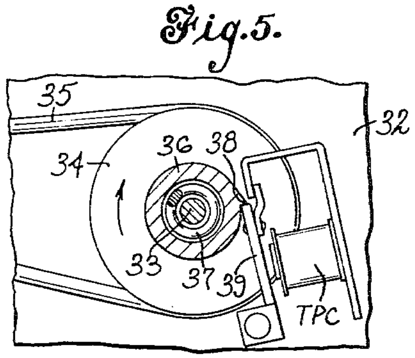

An electromagnetically operated tape perforating mechanism, arranged upon command to produce rows of selected perforations in a tape in accordance with information introduced into the network of FIG. 1 is illustrated in FIGS. 3, 4 and 5.

The tape perforating mechanism comprises a frame member 30 having side walls 31 and 32, FIG. 4, which rotatably support a shaft 33. Mounted on shaft 33 is a pulley 34 continuously driven by a belt 35 thereon from a drive means such as a motor, not shown. Shaft 33 is normally prevented from rotating by a clutch thereon which comprises a housing member 36 and a spring 37. Housing member 36 has a lug 38, FIG. 5, thereon which is engaged by a solenoid controlled blocking arm 39 controlled by tape perforate clutch solenoid TPC. When solenoid TPC is energized, the arm 39 is attracted thereto and housing member 36 and shaft 37 are then rotatively connected to pulley 34 by means of spring 37.

Shaft 33 has mounted thereon a drive cam 40, FIG. 3, having a camming lobe 41. Also mounted on shaft 33 are a pair of cams 42 which drive associated cam follower members 43, having upper and lower cam follower rollers 44 and 45, respectively. The cam followers are pivoted intermediate their ends to the frame by a pin 46. Carried on frame 30 are the eight tape perforate solenoids TA–TH of FIG. 1. However, for simplicity of illustration only solenoid TA and the perforating mechanism actuated thereby is illustrated in detail. It will be understood that each of the solenoids TA–TH operates a perforating mechanism, as hereinafter described.

When solenoids TA–TH are energized, they attract their associated latching members or arms 23 upwardly and unlatch levers 48, FIG. 3, therefrom. When a lever 48 is unlatched by an arm 23 it moves clockwise, as illustrated, under the bias of a spring 49 about a pivotal pin 50 and engages an end 51 of a perforating arm 52. Cam followers 43 carry a rod 53 therebetween which extend through aligned apertures provided therefor in perforating arms 52. Carried by the ends 54 of each of perforating arms 52 in a punch rod 55 guidably received in a punch guide 56 and having a punch 57 thereon adapted to be raised into die block 58 and selectively produce rows of perforatious tape 59 passing thereunder.

The perforating mechanism also comprises a lever return arm 60 pivoted about pin 50 and adapted to be actuated by a pin 61 carried by drive cam 40. When member 60 is engaged by pin 61, it is rotated counterclockwise, as illustrated, about pin 50 and a push plate 62 carried thereby returns levers 48 to their initial position where they may be latched by their respective solenoid latch arms 23.

In operation, when a command is given to the perforating mechanism to perforate tape therein, for example, by connecting line 18 of the network of FIG. 1 to ground through switch arm PR2, selected ones of solenoids TA–TH are energized and tape perforate clutch solenoid TPC attracts arm 39 thereto and clutches shaft 33 to pulley 34. When the selected ones of solenoids TA–TH are energized, their associated latching arms 23 are raised which allows associated levers 48 to move clockwise, as illustrated, and engage the ends 51 of selected ones of perforating arms 52. The selected ones of perforating arms 52 which are latched at their ends 51 by levers 48 correspond to selected ones of relays LA–LH which have been energized. Then, as cams 42 on shaft 33 rotate, they will raise cam follower rollers 44 causing cam followers 43 to raise rod 53 which will raise each of perforating arms 52 against the bias of an associated spring 63. When rod 53 is raised, it causes the perforating arms 52 which are latched at their ends 51 by levers 48 to drive the perforating punch rods and punches thereon through tape 59 into the die block 58. The perforating arms 52 which are not latched at their ends 51 by levers 48 will be rotated clockwise, as illustrated, under the bias of spring 63 and the perforating punch rods carried thereby will not produce perforations in tape 59.

As shaft 33 continues to rotate, pin 61 will engage return arm 60 moving it counter-clockwise about pin 50 and cause return plate 62 to push levers 48 back towards their original position. At the same time lobe 41 on drive cam 40 will engage a cam follower 64 on bell crank 65 which is pivoted to the frame at 66. When bell crank 65 is thus actuated it causes a lever 67 carried thereby to produce predetermined movement of ratchet wheel 68 and thus cause movement of sprocket wheel 69 secured thereto on a common shaft 70 to engage tape 59 and advance it in the direction of the arrow 71 a predetermined distance to set up a new row for perforation by punches 57. The operation of the mechanism as thus described comprises one cycle of operation and acts to produce one row of perforations in tape 59.

Figure 6:
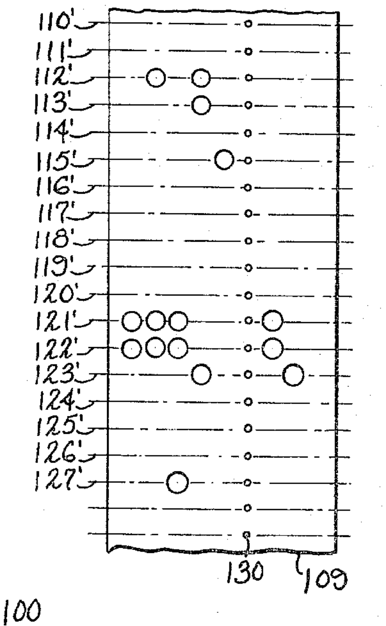
FIG. 6 is illustrative of a section of tape perforated in accordance with information on the coding schedule of FIG. 2.

FIG. 6 exemplifies a section of a tape of one type upon which the invention is adapted to operate. The tape 109 is adapted to be perforated across rows thereof in predetermined patterns and store and represent information thereon. It will be understood, of course, that the information recorded thereon is indicated by combinations of perforations and nonperforations in any given row.

The mechanism of FIGS. 3, 4 and 5, as illustrative of a perforating mechanism of a Frieden, Inc. tape perforator and has been utilized in practice of the invention. This particular mechanism is to be considered only as exemplary of mechanisms which may be utilized for perforating tape in accordance with the invention. The invention, in practice, is not limited to any particular perforating mechanism.

Considering the operation of the invention as thus far described, let it be assumed that probe member 20 is made to have contact with selected ones of conductor strips A through H, for example B and D, thereby energizing relays LB and LD and causing their respective contacts LB1, LB2 and LD1, LD2, to engage associated contacts EN and connect each of the relays LB and LD between lines 11 and 12, and latch the relays in an ON or energized state. Switches LB2 and LD2 are also closed on their associated contacts ED. Also, at this time signal lamps SB through SD are energized to visually indicate the relays LB and LD are in an ON or energized state. Now, when switch PR2 is closed, for example, by closing perforate switch PRS perforate relay PR is connected across terminal 13 and terminal 14 via line 16, thus energizing relay PR and causing it to close its controlled switch arms PR1 and PR2. Closing of switch arm PR2 establishes a circuit to ground through relay MT which becomes energized and closes its controlled switches MT1 through MT9 thereby establishing a circuit path from line 21 through each of tape perforate solenoids TB and TD and tape perforate clutch solenoid TPC to ground. In the present case, only solenoids TB and TD are connected to line 21 by virtue of switches LB2 and LD2 being closed on associated terminals ED. When tape perforate relays TB and TD are energized, the latching arms 23 controlled thereby unlatch the associated levers 48 and allow the associated levers 48 to engage the ends 51 of associated perforate arms 52 and thereby set up the arms 52 to perforate the tape 59 in a predetermined pattern upon rotation of the cam 42 as previously described.

In accordance with the invention, information stored in relays LA through LH is transmitted to the tape upon command after all information for a given row of perforations has been stored in the register 10 comprising relays LA–LH.

The means for commanding the circuit of FIG. 1 to actuate the tape perforating mechanism comprise a perforate relay PR connected across input terminals 13 and 14 through normally open switch PRS. When switch PRS is closed upon its contacts, relay PR is energized and closes controlled switch arms PR1 and PR2, on associated contacts. Closing of switch PR2 establishes a circuit through relay MT, selected ones of solenoids TA–TH and solenoid TPC, as previously described. Closing of switch PRS also connects relays TD and TF across terminals 13 and 14 through normally-closed switch arm RP1.

In accordance with an aspect of the invention, relays TDR and TFR are arranged to provide a timing function which ensures that the memory units of register 10 are cleared of information stored therein upon command of the tape perforating mechanism to perforate. The time of actuation of switch arm TD1 in response to energization or de-energization of relay TDR is longer than that of switch arm TF1 in response to energization or de-energization of relay TFR. When perforate switch PRS is closed both TDR and TFR are energized and switch arm TF1 immediately switches from contact 24 to contact 25 thereby setting up a circuit path from line 15 through switch TF1 and switch PRS to line 16, which circuit is maintained so long as switch PRS is closed and relay TFR energized. This circuit ensures that lines 12 and 11 are connected to terminals 13 and 14, respectively. Relay TDR, by virtue of its timed delay characteristic does not open switch arm TD1 until switch arm TF1 is closed on contact 25. Then, when switch arm TD1 is opened, line 11 is no longer connected to line 16 through switch arm TD1, but is connected to line 16 through switch arm TF1 and switch PRS. Now, when switch PRS is opened, switch arm TF1 immediately returns to contact 24, disconnecting line 15 from line 16 and switch arm TD1 closes after switch arm TF1 closes on contact 24, thereby ensuring that line 15 is disconnected from line 16 and thereby interrupting any circuit paths through LA–LH. All relays LA–LH are thereby reset to an OFF or de-energized state prior to storing additional information therein for transmittal to the tape perforating mechanism to perforate another row of tape.

The invention further provides means for advancing the tape a plurality of rows without perforating, if so desired. Such means are represented by normally open switch arm 26 connected across the terminals of switch PRS and a star wheel 27 or other multiple switch make-and-break mechanism arranged to repetitively open and close switch arm 26. It may be noted that when switch arm 26 is closed, perforate relay PR is connected across terminals 13 and 14 and closes switches PR1 and PR2. As previously described when switch PR2 is closed a circuit is established through relay MT which picks up contacts MT1 through MT9. However, if it is desired to merely advance the tape a selected number of rows without producing perforations therein, the closing of switches MT1 through MT8 has no practical effect inasmuch as with relays LA–LH de-energized, switch arms LA2–LH2 will be open and solenoids TA–TH will not be energized. However, when switch MT9 is closed tape perforating clutch solenoid TPC is energized and as previously explained, the tape will be advanced one row. Thus, by rotating star wheel 27 a given distance, the lobes thereof will close and open switch arm 26 a selected number of times thereby producing a selected advance of the tape. While the tape advance control has been simply illustrated as a switch and actuating star wheel, it is to be understood that it may be any device which will repetitively open and close a switch, for example, it could be the switching mechanism operated by a telephone dial.

Means are also provided in accordance with the invention for repeating a row of perforations without clearing and resetting the register. Such means prevent clearing of register 10 after closing of switch PRS and comprise, as illustrated, relays RP and RT connected in series with a repeat switch RPS across terminals 13 and 14. When repeat switch RPS is closed on its contacts, relays RP and RT are energized. Energization of relay RT opens its normally-closed controlled switch arm RT1 thereby preventing timing relays TD and TF from becoming energized, and operating to reset the relays LA–LH to an unenergized state as heretofore explained. Energization of relay RP closes normally-open switch arms RP1 and RP2, controlled thereby. Closing of switch arm RP2 connects line 11 to line 16 and closing of switch RP1 connects relays RP and RT across lines 12 and 16 and hence terminals 13 and 14 thereby latching relays RP and RT. Now, when perforate switch PRS is closed, tape 59 will be perforated and advanced as previously described.

When switch arm PR1 closes upon energization of perforate relay PR it connects both sides of relay RP to line 16 thereby de-energizing RP, and switch arms RP1 and RP2 open. Upon closing of switch arm PR2 the perforating mechanism is actuated by connecting line 18 to ground. So long as perforate switch PRS is closed, switch arm PR1 is closed and relay RT1 remains energized by virtue of the circuit therethrough to switch arms PR1, TF1 and TD1 to line 16 and terminal 14. However, since switch arm RT1 is opened timing relays TD and TF do not operate, and the selected ones of relays LA–LH remain energized by virtue of the connection of line 15 through switch arm TD1 to line 16 and terminal 14. Now, when perforate switch PRS is again closed, relay PR is energized and switch arm PR2 connects line 18 to ground and the previous row of perforations is repeated. However, now that relay RT is de-energized and switch arm RT1 remains closed, relays TD and TF perform the timing function previously described and clear the register by breaking the connection of line 15 to line 16. In this manner a row of perforations may be repeated, once without clearing and resetting the register.

A row of perforations may be repeated a plurality of times by holding repeat switch RPS closed and actuating star wheel 27 to close switch 26 the number of times a given row of perforations is to be repeated less one, then opening switch RPS and closing perforate switch PRS. Alternately, repeat switch RPS may be held closed and perforate switch closed the number of times desired.

If desired, a conductive plate 29 may be electrically connected to the terminal 14 side of repeat switch PRS so that relays RP and RT may be energized merely by touching probe member 20 to plate 29.

The invention further provides means for erasing any information stored in the memory units prior to commanding such information to be transmitted to the perforating mechanism. Connected across lines 12 and 16 is an error relay ER in series with a normally-opened error switch ERS. Relay ER controls switch arm ER1 in line 16 between terminal 13 and connection of line 16 to line 11. When error switch ERS is closed, relay ER is energized causing its controlled switch arm ER1 to open, which breaks the circuit through relays LA–LH, thereby de-energizing these relays. Therefore, it may be seen that prior to commanding the perforating mechanism to produce a row of perforations in tape in accordance with information stored in the memory units, the information stored in the memory units may be erased therefrom. This feature of the invention allows any error in the information introduced into the memory units to be erased prior to commanding a row of perforations in the tape. This feature, together with the visual indicators SA–SH allows a check on the information stored in the memory units prior to perforation of a tape, greatly minimizes a possibility of incorrect perforations of the tape and facilitates use of the invention by a relatively unskilled or untrained person.

Figure 2:
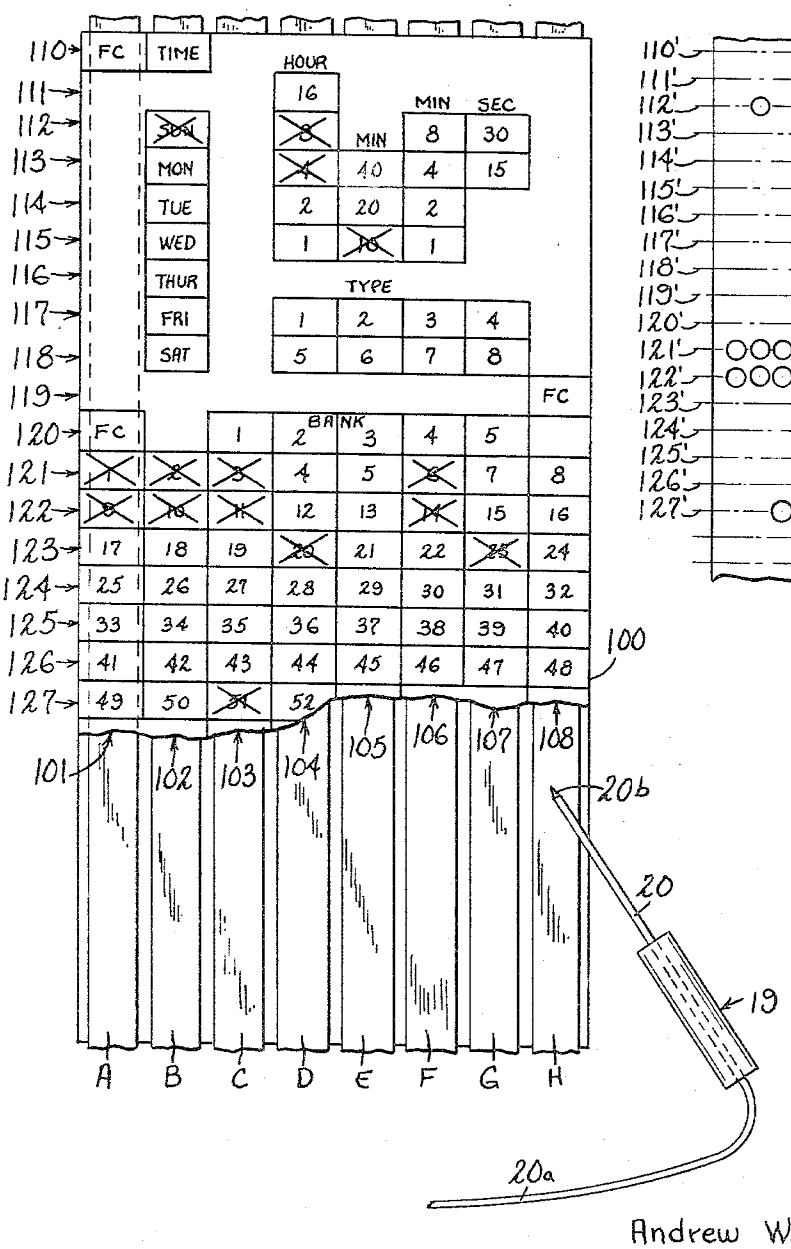
FIG. 2 is illustrative of the manner in which information in a coding schedule is transferred to the network of FIG. 1 in accordance with the invention.

Reference is now made to FIG. 2, which in accordance with the invention, illustrates a preferred technique of introducing information into the memory units LA–LH of FIG. 1. FIG. 2 shows a porion of a programming schedule 100 of a type used in planning a program for perforated tape controlled traffic control systems. It will be noted that schedule 100 has eight columns of information blocks or bits 101–108 corresponding to eight possible perforations across a perforating row of a tape 109 (FIG. 6). Also, it will be noted that tape 109 is illustrated as perforated in accordance with the marked blocks or bits of the schedule. For purposes of discussion only, the rows of schedule 100 are indicated by the reference numerals 111–128 and corresponding rows in tape 109 are marked with the same numeral primed.

It will be understood that the term "rows" as applied to tapes is selected only for purposes of discussion inasmuch as there are no defined rows as such on the tapes.

The schedule 100 is positioned over parallel conductor strips A–H with each column 101–108 over a strip A–H, respectively. To transfer the information on the schedule 100 to the memory units and hence to tape 109, conductive probe 20, having a piercing point 20*b*, pierces the schedule, which is a paper sheet, in the marked blocks in row 111. Probe 20 then contacts conductor strips B and D and completes circuits through relays LB and LD, FIG. 1, which close controlled switch arms LB1 and LD1 on associated terminals EN to latch themselves in an energized state. Relays LB and LD also switch arms LB2 and LD2 on associated terminals ED, as previously explained. Now, when perforate switch PRS is closed, the perforating mechanism is actuated as previously explained and the tape 109, FIG. 6, is perforated in row 112′, as illustrated, and advanced one row. Probe 20 is next caused to pierce schedule 100 at the block marked in row 113 to energize relay LD. Then when perforate switch PRS is closed, a corresponding perforation is produced in row 113′ of tape 109. The next row 114 in schedule 100 and the corresponding row 114′ in tape 109 may be advanced without perforating by depressing perforated switch PRS. Inasmuch as none of the relays LA–LH are energized, no perforations will be made in row 114′ of tape 109.

After the tape is perforated in row 115′ in accordance with the marked blocks on schedule 100, the tape may be advanced five rows without perforating by closing and opening perforate switch PRS five times advancing tape 109 five rows (116′, 117′, 118′, 119′ and 120′). Alternatively, the tape 109 could be advanced the five rows by actuation of star wheel 27 to close and open switch 26 five times.

It will be noted that the information noted in rows 121 and 122 of schedule 100 is marked in corresponding columns. Therefore, when the information in row 121 is placed in the memory units by energizing relays LA, LB, LC and LF, by contacting conductor strips A, B, C and F, with piercing point 20*b* through the marked blocks, the same perforations may be made in both rows 121′ and 122′ of tape 109 by closing repeat switch RPS or touching probe member 20 to plate 29 and then closing perforate switch PRS twice which will cause production of identical rows of perforations 121′ and 122′. In a similar manner, a row of perforations may be repeated any number of times without clearing the memory units by holding repeat switch RPS closed and utilizing star wheel 27 to repetitively open and close switch arm 26 as previously explained. Subsequently, rows 123′, 126′ and 127′ of tape 109 may be perforated in accordance with the information in rows 123, 126 and 127 of schedule 100 in the manner previously described.

In tape 109, the smaller perforations 130 are engaged by sprocket wheel 69, upon actuation thereof by bell crank 65, to advance the tape one row. The perforations 130 may be produced in the tape by a punch mechanism, not shown, included in the apparatus of FIGS. 3, 4 and 5, which produces perforations each time clutch TPC is energized. Alternatively, the tape may have perforations 130 pre-punched therein prior to insertion of the tape in the perforating mechanism.

It will be apparent that information is encoded in register 10 by energization of selected ones of memory units LA–LH and the encoded information may then be represented by corresponding perforations across a row in the tape upon command by closing perforate switch PRS which actuates the perforating mechanism. Various bits of intelligence may be represented by the ON or OFF conditions of the plurality of memory units. It will also be apparent that the register 10 may receive, store and produce perforation of tape in accordance with binary encoded decimal numbers. In this respect, the energization of each of the relays LA–LH may correspond to the binary "1" state and lack of energization thereof correspond to the binary "0" state.

It will be recognized by those skilled in the art that the invention may be practiced in various forms and embodiments thereof. For example, the register 10, illustrated herein as comprising relays LA–LH, may be composed of other memory devices such as bi-stable flip-flop circuits. Moreover, various circuitry illustrated as comprising relay controlled switching elements may be constructed of so called static switching elements, i.e., semi-conductor devices. Also, it will be recognized that in some applications the relays LA–LH and solenoids TA–TH, respectively, may be combined into a single unit which performs the functions of both. The probe member 20 in some cases may be constructed so that it need not pierce the schedule 100, which is only a sheet of paper, but may be constructed to establish a capacitive connection with the strips A–H.

It is also to be understood that the register 10 and the means providing operation thereof including conductive strips A–H and probe member 20 are not limited to utilization with a tape perforating mechanism, and may find utilization in other environments.

Accordingly, it is intended that the appended claims cover all embodiments of the invention as well as modifications to the disclosed embodiments thereof which do not depart from the spirit and scope of the invention.

What is claimed is:

1. Tape perforating apparatus comprising a plurality of aligned punches adapted to produce perforations across a tape; a plurality of solenoids each arranged upon energization thereof to render an associated punch operative to perforate the tape; a plurality of relays, first and second switch means controlled by each of said relays; a plurality of conductors, each electrically connected to a terminal of one of said relays; a conductive probe member, said probe member being effective to establish an electrical connection to said conductors; means for connecting said probe member and said relays across a source of electric energy whereby when said probe member establishes an electrical connection to selected ones of said conductors, the relays connected thereto are all energized and operate said controlled first and second switch means; said first switch means controlled by each relay being effective to connect its relay across a source of potential and latch the controlling relay, said second switch means controlled by each relay being effective to enable a selected one of said solenoids to be energized; means for energizing enabled solenoids to produce perforations in said tape; and means, responsive to said means for energizing, for de-energizing said relays.

2. The apparatus of claim 1 wherein said conductors comprise parallel strips of conductive material and said probe member comprises a point adapted to pierce a coding schedule positioned over said strips to energize said relays in accordance with information noted on the schedule.

3. The apparatus of claim 1 including means for de-energizing said relays upon energization thereof without energizing enabled solenoids.

4. The apparatus of claim 1 including means for visually indicating the state of energization of each of said relays.

5. The apparatus of claim 1 including means for disabling said means for de-energizing and repetitively perforating a tape in accordance with the energized relays.

6. Tape perforating apparatus comprising a plurality of aligned punches adapted to produce perforations across a tape; a plurality of solenoids each arranged upon energization thereof to render an associated punch operative to perforate the tape; a plurality of bi-stable electrical memory units settable in one of two conductive states, each of said memory units controlling enabling means for energizing an associated one of said solenoids; a plurality of conductors, each electrically connected to one of said memory units; a conductive probe member, said probe member being effective to establish an electrical connection to said conductors; means for connecting said probe member and said memory units across a source of electric energy whereby when said probe member establishes an electrical connection to selected ones of said conductors the memory units connected thereto are set in one of said states; means for energizing enabled solenoids to produce perforations in said tape; and means responsive to perforation of said tape for resetting said memory units to the other of said states.

7. The apparatus of claim 1 wherein said conductors comprise strips of conductive material and said probe member comprises a point adapted to pierce a coding schedule positioned over said strips to energize said memory units in accordance with information noted on the schedule.

8. Tape perforating apparatus comprising a plurality of aligned punches arranged when enabled to produce perforations across a tape; a plurality of bi-stable electrical elements settable in one of two conductive states, each of said elements controlling enabling means for operating an associated one of said punches; a plurality of conductors, each electrically connected to one of said elements; a conductive probe member, said probe member being effective to establish an electrical connection to each of said conductors; means for connecting said probe member and said memory units across a source of electric energy whereby when said probe member establishes an electrical connection to selected ones of said conductors the elements connected thereto are set in one of said states; means for causing enabled punches to produce perforations in said tape; and means, responsive to said means for causing, for resetting said elements to the other of said states.

9. The apparatus of claim 8 wherein said conductors comprise parallel strips of conductive material and said probe member comprises a point adapted to pierce a coding schedule positioned over said strips to set said elements in accordance with information noted on said schedule.

10. The apparatus of claim 8 wherein said elements are relays which upon energization thereof by said probe member are latched in an energized state.

11. Tape perforating apparatus comprising a plurality of aligned punches adapted to produce perforations across a tape; a plurality of solenoids each arranged upon energization thereof to render an associated punch operative to perforate the tape; a plurality of relays, each of said relays controlling a first switch arranged to connect one of said solenoids across terminals connectable to a source of solenoid energizing potential; enabling means controlling a plurality of switches for connecting all of said solenoids across said terminals; a plurality of parallel conductor strips, each electrically connected to a terminal of one of said relays; a conductive probe member, said probe member being effective to establish an electrical connection to said conductors through a coding schedule to energize selected ones of said relays in accordance with information noted on the schedule; means for connecting said probe member and said relays across terminals connectable to a source of electric energy whereby when said probe member establishes an electrical connection to selected ones of said conductors, the relays connected thereto are energized; means for causing said enabling means to close said plurality of switches and energize selected solenoids to render associated punches operative to produce perforations in said tape; and means, responsive to said means for causing, for de-energizing said relays.

12. The apparatus of claim 11 wherein said probe member has a point adapted to pierce a coding schedule positioned over said strips.

13. The apparatus of claim 11 including means for disabling said means for de-energizing said relays and repetitively perforating a tape in accordance with the energized delays.

14. The apparatus of claim 11 including means for de-energizing said relays upon energization thereof without energizing said solenoids.

15. An information storage device comprising a plurality of bi-stable electrical memory units settable in one of two conductive states to store information in accordance with the conductive states of said memory units; a plurality of conductors, each connected to one of said memory units; a conductive probe member, said probe member being effective to establish an electrical connection to selected ones of said conductors; means for connecting said probe member and said memory units across terminals connectable to a source of electric energy whereby when said probe member establishes an electrical connection of selected ones of said conductors the memory units are set in said one of said states, said probe member having a portion thereof effective to establish an electrical connection to said conductors through a coding schedule positioned over said conductors to set selected ones of said memory units in accordance with information noted on the schedule.

16. The device of claim 15 wherein said conductors comprise parallel conductor strips and said probe member has a point adapted to pierce a coding schedule.

17. Recording apparatus comprising a plurality of independent electrically conductive members, an electrically responsive memory device having two stable states connected to each of said members, a conductive probe member arranged to be selectively coupled to said members, and means for connecting said probe member and said memory devices across a source of potential so that said memory devices may be selectively set to a first of their states when said probe member is coupled to a corresponding conductive member.

18. Recording apparatus comprising a plurality of independent strips of electrically conductive material arranged in parallel side-by-side relation, an electrically responsive memory device having two stable states connected to each of said stripes, a conductive probe member arranged to be selectively coupled to said strips, and means for connecting said probe member and said memory devices across a source of potential so that said memory devices may be selectively set to a first of their states when said probe strip is coupled to a corresponding member.

19. Recording apparatus comprising a plurality of independent electrically conductive members, an electrically responsive memory device having two stable states connected to each of said members, a conductive probe member arranged to be selectively coupled to said members, and means for connecting said probe member and said memory devices across a source of potential so that said memory devices may be selectively set to a first of their states when said probe member is coupled to a corresponding member, said probe member having a point adapted to pierce a coding schedule positioned over said members.

References Cited by the Examiner

UNITED STATES PATENTS

| | | | |
|---|---|---|---|
| 2,021,311 | 11/35 | Johnstone et al. | 234—57 |
| 2,039,806 | 5/36 | Kolm | 234—55 |
| 2,197,306 | 4/40 | Ingraham | 35—48 |
| 2,328,654 | 9/43 | Lake et al. | 234—57 |
| 2,770,304 | 11/56 | Tholstrup | 234—55 |
| 2,943,400 | 7/60 | Griswold | 35—48 |
| 3,100,352 | 8/63 | Boissevain | 35—9 |

FOREIGN PATENTS

| | | |
|---|---|---|
| 284,447 | 11/52 | Switzerland. |

ANDREW R. JUHASZ, *Primary Examiner.*

J. SPENCER OVERHOLSER, *Examiner.*